Oct. 3, 1939.  W. J. GREENLEAF  2,174,741
CUTTING TOOL
Filed May 26, 1937  2 Sheets-Sheet 1

WITNESSES:  INVENTOR.
Walter J. Greenleaf
BY Brown, Critchlow & Hick
his ATTORNEYS.

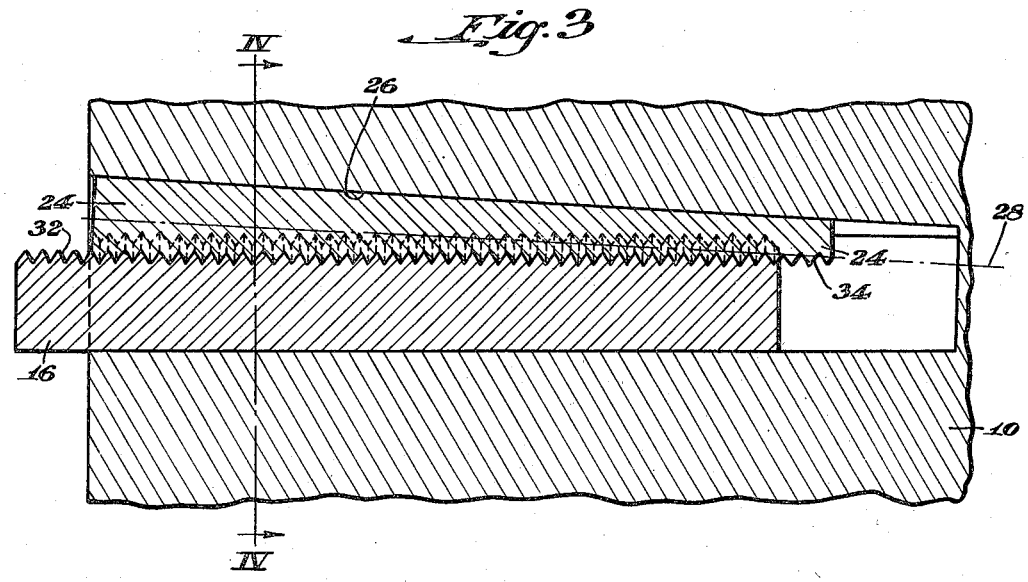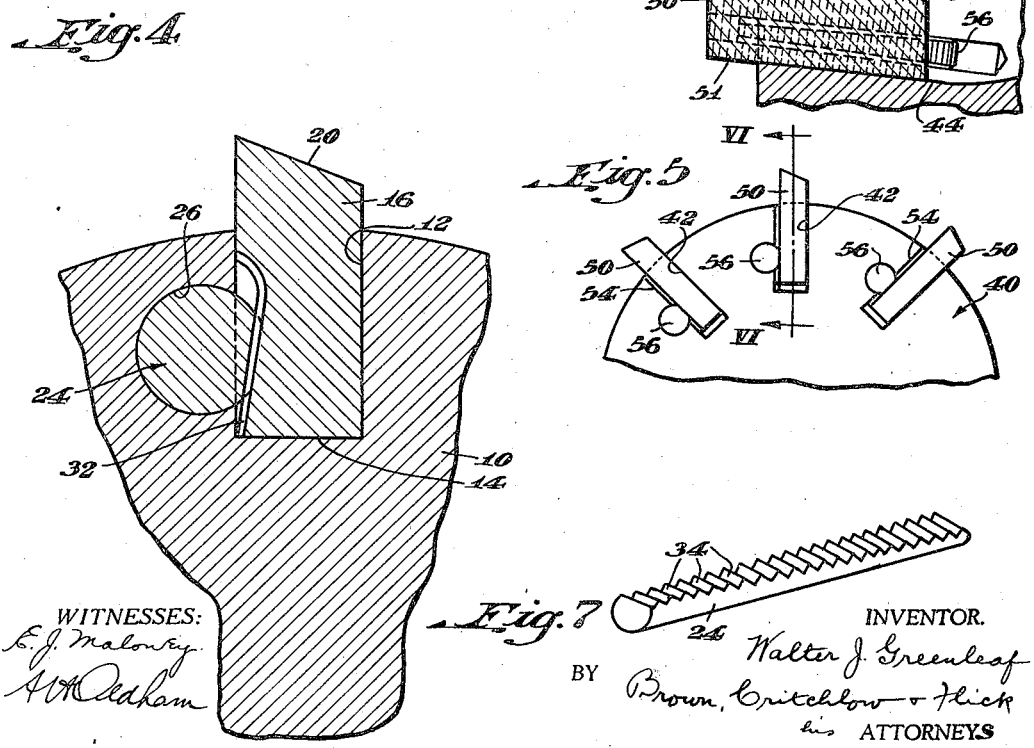

Patented Oct. 3, 1939

2,174,741

UNITED STATES PATENT OFFICE 2,174,741

CUTTING TOOL

Walter J. Greenleaf, Meadville, Pa.

Application May 26, 1937, Serial No. 144,794

2 Claims. (Cl. 29—105)

This invention relates to tools comprising a holder and a removable work-engaging tool member, and more particularly is concerned with rotary tools, such as reamers, broaching tools and the like, and to means for adjustably and releasably clamping cutter blades and similar tools in holding members.

While heretofore reamers and similar tools have been provided which include cutter blades releasably and adjustably received in holding members, nevertheless it is well recognized that in present tools of this character adjustment is often difficult and time consuming, and further the elaborate means heretofore usually provided for achieving the desired adjustment and releasable mounting have often produced in a rotary tool having a plurality of circumferentially spaced cutter blades a relatively weak support for the blades as well as being initially expensive and requiring maintenance care. The apparatus provided in my Patent No. 2,037,466 overcomes many of the disadvantages of and objections to known tools of the character herein discussed and the present invention is concerned with a modification of and an improvement to the tool mounting disclosed in my referred-to patent.

It is the general object of my invention to provide a tool including a holder and an adjustably mounted work-engaging member, such as a blade, wherein the holder is adapted to receive a plurality of such blades without weakening the holder and wherein the adjusting means are relatively simple, inexpensive and easily operated in a minimum of time.

The foregoing and other objects of my invention, such as will become evident as the description proceeds, are achieved by the provision of a holder having a blade-receiving slot therein, the bottom surface of the slot being inclined relative to the axis of the holder, and a blade positioned in the slot. Completing the assembly of parts is a round wedge pin formed with a longitudinal taper which pin is removably positioned parallel to the inclined bottom of the slot in a suitable recess in the side of the slot of the holder and the wedge pin is constructed and arranged to wedge between the blade and the holder. Complemental interlocking means are provided on the contacting faces of the blade and wedge pin so that by adjusting the relation of the wedge pin and the blade prior to pushing them together into the holder, the blade is adjusted in the holder, all as hereinafter particularly described.

Figure 1:
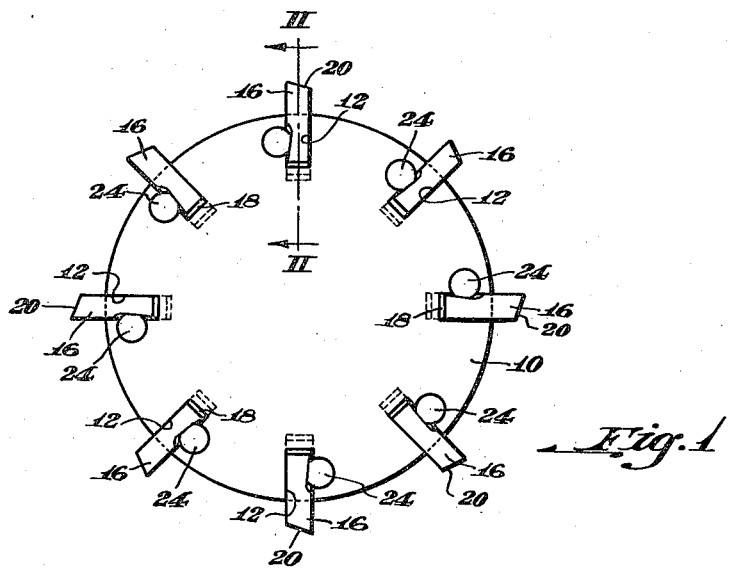
Figure 2:
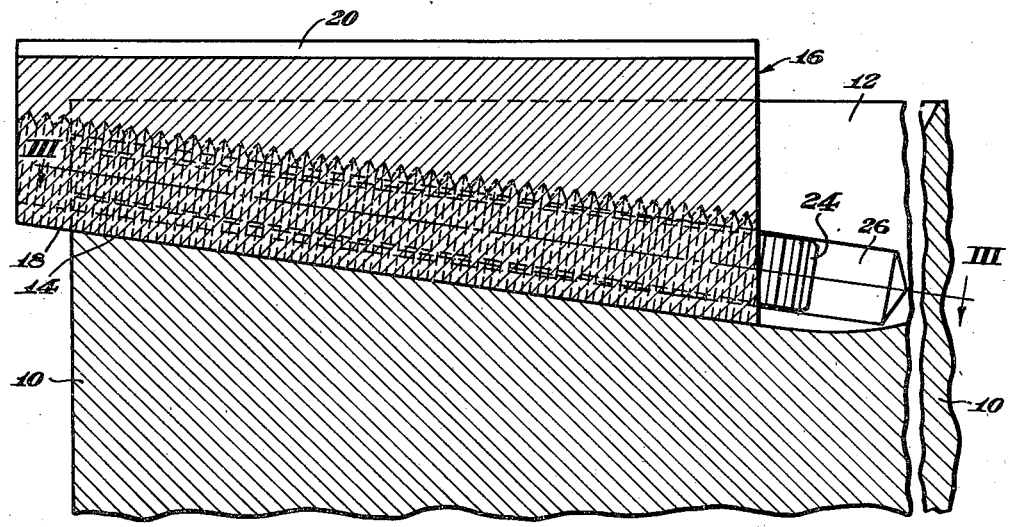

In the accompanying drawings, Fig. 1 is an end elevation of one embodiment of my invention; Fig. 2 is an enlarged longitudinal cross-sectional view taken on line II—II of Fig. 1; Fig. 3 is a longitudinal cross-sectional view taken on line III—III of Fig. 2; Fig. 4 is a transverse cross-sectional view taken on line IV—IV of Fig. 3; Fig. 5 is a partial end elevation of another embodiment of my invention; Fig. 6 is a longitudinal cross-sectional view taken on line VI—VI of Fig. 5; and Fig. 7 is a perspective view on reduced scale of the wedge pin.

While the principles of my invention are broadly applicable to tools of various kinds and specifically rotary tools for performing a wide variety of work, they are particularly beneficial in mounting a plurality of cutter blades in a holder, as for example to provide a reamer. Hence my invention has been illustrated in the drawings as applied to a reamer and will be so described.

In the embodiment of my invention shown in Figs. 1 to 4, the numeral 10 indicates generally a holding member such as a head or turret head adapted to be mounted for rotary movement about its axis, as for example in a lathe or other machine tool apparatus. The holder 10 is formed with a plurality of longitudinally extending slots 12, which may be of any desired number, as will be understood, but which are conveniently eight in number, as illustrated in Fig. 1. Each of the slots 12 is formed with its bottom at an angle to the axis of the holder. As best seen in Fig. 2, the bottom of the open end of the slot is a greater distance radially from the axis of the holder 10 than is the bottom of the closed end of the slot.

Slidably received in each slot 12 is a cutter blade, indicated generally at 16, which is formed with an inclined bottom 18 which is complemental with the surface 14 of the slot 12. The outer edge of each cutter blade is formed with an inclined cutting edge 20, as will be understood by those skilled in the art.

In order to adjustably lock the cutter blade 16 in its slot 12 I provide a wedge pin, indicated as a whole by the numeral 24. The wedge pin 24 is round, as shown, which simplifies machining of it and its recess. The wedge pin is formed with one tapered flat face and is received in a recess 26 formed in a side wall or surface of the slot 12. As best seen in Fig. 3, the recess 26 constitutes a round bore of such a size as to slidably receive the wedge pin 24 with the axis of the recess being indicated in Fig. 3 by the numeral 28. From Fig. 3 it will be recognized that the axis 28 of the recess 26 is formed at an angle to the axis of the holder 10 although parallel to the bottom 14 of the slot 12.

The engaging or contacting faces of the blade 16 and the wedge pin 24 are formed with complemental interlocking engagements which may take a variety of forms. As for example, pin and slot interlocking means can be provided, but I preferably employ interlocking teeth which may be of any desired profile, such as the V-shaped profile illustrated. Specifically, the blade 16 is formed with a plurality of teeth 32 which are cut in the side of the blade 16 adjacent the wedge pin 24 and so that the teeth extend perpendicular to the bottom 14 of the slot 12. As best shown in Fig. 4 the teeth 32 are cut upon an angle to the opposite face of the blade so that, as hereinafter described, the wedge pin 24 not only locks the blade 16 against the opposed wall of the slot 12 but also has a down thrust to lock the blade against the inclined bottom 14 of the slot 12.

The wedge pin 24 is provided with complemental teeth 34 which are formed the full length of the pin on the tapered flat surface thereof which provides the pin with a wedge shape. This is particularly evident from Fig. 3 wherein the axis 28 of the recess 26 likewise indicates the axis of the wedge pin 24. It will be recognized that at the larger end of the pin 24 the teeth 34 are substantially short and on the outer surface of the pin. However, at the other end of the pin the teeth extend substantially across the diameter of the pin and are approximately equal in length to the diameter. A line drawn perpendicular to the last-named teeth and extending to the curved surface of the pin remote from the teeth is substantially equal to or slightly greater than the radius of the pin.

In the operation of this embodiment of my invention, the pin 24 and blade 16 are first positioned together so that the teeth 34 on the pin interlock with the teeth 32 on the side of the blade. The blade and pin are then moved into the slot 12 and the recess 26, respectively, of the holder 10 until the wedging action of the pin 24 locks the blade in position. This wedging action is not only against the opposite wall of the slot 12 but also urges the blade down into firm load-bearing engagement with the bottom 14 of the slot. If the blade extends radially of the holder 10 too great a distance the blade and pin are removed and the pin is moved outwardly over the blade one or more teeth and the parts are reassembled in the holder, as before described. If the blade does not extend radially far enough in the holder 10, the pin and blade are removed and the pin is moved inwardly of the blade one or more teeth and the parts are reassembled, as will be understood.

By making the inclination of the surfaces 14 and 18 at the proper angle, and by making the interlocking teeth 32 and 34 of the blade and pin the desired size, and by making the wedging action of the pin 24 and recess 26 the proper inclination, it is easy to obtain any desired type of radial adjustment between the blade and its holder.

However, once the parts have been proportioned as desired, the ordinary machinist can quickly and easily obtain the desired adjustment of the blade. It is an easy matter to loosen the blade and wedge pin in the holder by tapping to move them together outwardly of the holder, and it is equally easy to lock them in the adjusted positions by likewise tapping them in the opposite direction into the holder. While the adjustment of a single blade has been described, it will be recognized that the remaining blades in a reamer, for example such as shown in Fig. 1, can readily be similarly adjusted or removed.

The modification of my invention illustrated in Figs. 5 and 6 is generally similar to that shown in Figs. 1 to 4 and heretofore described. Particularly, the numeral 40 indicates generally a holder provided with appropriate slots 42 which extend longitudinally of the holder and which are formed with inclined bottom portions 44. Cutter blades 50 removably received in the slots 42 are provided with bottom surfaces 51 which are complemental to and engage with surfaces 44, as best seen in Fig. 6.

The side of each blade 50 is formed with radially extending interlocking means, such as teeth 54, and wedge pins 56 similar to the pins 24 heretofore described are received in suitable recesses in the holder for wedging between the holder and the cutter blades 50. The wedge pins 56 are formed with interlocking means, such as teeth, which are complemental to the teeth 54 formed on the side of each blade.

The operation of this embodiment of my invention is substantially identical to that heretofore described and will not be explained in detail. Suffice it to say that by adjusting the relation between a wedge pin 56 and its blade 50 and then moving these parts together into their recess and slot 42, each blade can be adjusted to a desired radial position in the holder 40.

From the foregoing it will be recognized that the objects of my invention have been achieved by the provision of a tool having adjustably mounted work-engaging members which can be rapidly positioned as desired and within closely controlled and easily determined limits. The apparatus is relatively inexpensive and adapts itself to many uses. The work-engaging members are received in a holding member without weakening the holding member even though a considerable number of work-engaging members are so received. In this connection it should be noted that the round wedge pins and wedging recesses I employ provide an inexpensive but sturdy construction wherein a relatively small amount of metal is removed from between adjacent slots on the head 10 so that the complete tool is much stronger than tools made heretofore employing relatively wide and flat blade wedging members.

While in accordance with the patent statutes my invention has been specifically illustrated and described, it will be understood that the invention is not limited thereto or thereby but is defined in the appended claims.

I claim:

1. The combination in a tool of a rotary holder having a blade-receiving, substantially longitudinally extending slot therein and of rectangular shape in cross section, one surface of the slot being inclined relative to the axis of the holder, a blade of rectangular shape in cross section positioned in the slot, an inclined surface on the blade engaging with the inclined surface of the slot whereby movement of the blade longitudinally of the slot effects radial movement of the cutting edge of the blade relative to the holder, a round wedge pin removably positioned parallel to the bottom of the slot in a suitable recess in another surface of the slot and constructed and arranged to wedge between the blade and the holder, the pin-receiving recess being on an angle to the center line of the slot, and complemental interlocking teeth on the interengaging faces of the blade and wedge pin.

2. A rotary tool comprising a rotary head having a longitudinally extending slot therein which is open radially of the head and axially at one end thereof, the sides of the slot being substantially parallel to each other and the axis of the head, the bottom of the slot being inclined relative to the axis of the head, a cutter blade received in the slot and having an inclined bottom complemental to the bottom of the slot, a tapered wedge pin removably received in a recess in the side wall of the slot, the axis of the recess being parallel to the bottom of the slot and inclined to the plane of the side wall of the slot, and complemental interengaging portions on the side of the cutter blade and on the wedge pin.

WALTER J. GREENLEAF.